United States Patent
Mariman et al.

(10) Patent No.: US 8,350,689 B2
(45) Date of Patent: Jan. 8, 2013

(54) PNEUMATIC PRODUCT-ON-DEMAND DELIVERY SYSTEM FOR AN AGRICULTURAL MACHINE WITH A HOSE DISCONNECT MONITOR

(75) Inventors: Nathan Albert Mariman, Geneseo, IL (US); Paul Reed Riewerts, Port Byron, IL (US)

(73) Assignee: Deere & Company, Moline, IL (US)

( * ) Notice: Subject to any disclaimer, the term of this patent is extended or adjusted under 35 U.S.C. 154(b) by 588 days.

(21) Appl. No.: 12/611,533

(22) Filed: Nov. 3, 2009

(65) Prior Publication Data

US 2011/0102168 A1      May 5, 2011

(51) Int. Cl.
*B60Q 1/00*      (2006.01)
(52) U.S. Cl. ....................................................... 340/451
(58) Field of Classification Search .................. 340/451, 340/540, 609, 684, 606, 611; 111/100, 130
See application file for complete search history.

(56) References Cited

U.S. PATENT DOCUMENTS

| | | | | |
|---|---|---|---|---|
| 4,149,163 A * | 4/1979 | Fathauer | ....................... | 340/684 |
| 4,166,948 A | 9/1979 | Steffen | | |
| 4,185,224 A * | 1/1980 | Thompson | ..................... | 340/684 |
| 4,333,096 A * | 6/1982 | Jenkins et al. | ................ | 340/684 |
| 4,369,895 A * | 1/1983 | McCarty et al. | .................. | 221/3 |
| 5,177,470 A * | 1/1993 | Repas | ............................ | 340/684 |
| 5,831,539 A * | 11/1998 | Thomas et al. | ................ | 340/674 |
| 6,661,514 B1 * | 12/2003 | Tevs et al. | ...................... | 356/337 |
| 6,935,256 B1 * | 8/2005 | Meyer | ............................ | 111/174 |
| 7,025,010 B2 | 4/2006 | Martin et al. | | |
| 2010/0192821 A1 * | 8/2010 | Garner et al. | ................. | 111/130 |

* cited by examiner

*Primary Examiner* — Phung Nguyen

(57) ABSTRACT

The present invention provides a monitor of the hose connection of a pneumatic product-on-demand delivery system in an agricultural machine. This can be done in several ways. One way is to sense the product flow in the product hose and how long it is running. If the product is constantly running through the hose, that indicates a disconnection. A second way is to sense air pressure in the product hose to determine if it is still operating under pressure. If disconnected, the air pressure will drop indicating a disconnection. A third way is to sense a current through the connection to determine if it is on or off. All of these methods produce a signal that can be fed back to a monitor at the operator station and give the operator an alert if a disconnected hose is detected.

6 Claims, 2 Drawing Sheets

PNEUMATIC PRODUCT-ON-DEMAND DELIVERY SYSTEM FOR AN AGRICULTURAL MACHINE WITH A HOSE DISCONNECT MONITOR

FIELD OF THE INVENTION

The present invention is directed to a pneumatic product-on-demand delivery system for an agricultural machine and in particular to a monitor for these system.

BACKGROUND OF THE INVENTION

Pneumatic product-on-demand delivery systems have been used on agricultural seeding machines to automatically direct seed from a main seed hopper to a plurality of individual planting units. Each of the individual planting units has an auxiliary seed hopper for receiving the seed, a seed meter for metering the seed from the auxiliary seed hopper and a furrow opener for forming a planting furrow into which the metered seed is deposited. A fan is used to create pressurized air that forms an air stream on which the seed is taken to the planting units. These systems automatically replenish the auxiliary hoppers as needed. An example of a pneumatic product-on-demand delivery system is shown in U.S. Pat. No. 7,025,010.

A pneumatic product-on-demand delivery system has a series of hoses to deliver the seed from the main seed hopper to the auxiliary seed hopper. The product hose has a connection point that allows the hose to be disconnected from the hopper for the meter to be removed. If this connection works its way off while planting, then the delivery system will keep running and spread seed on the ground. This will likely not be noticed until the operator turns around at the end of the row to plant in the other direction. By that time, the system has dropped several bushels of expensive seed onto the ground which can no longer be used.

SUMMARY OF THE INVENTION

The present invention provides a sensor to monitor the product hose for failure. This can be done in several ways. One way is to sense the seed flow in the product hose and how long it is running. If the seed is constantly running through the hose, that indicates a disconnection or other hose failure such as a hole in the hose resulting in the loss of seed on the ground. A second way to detect a hose failure is to sense air pressure in the product hose to determine if it is still operating at the proper pressure. If the hose is disconnected or an air leak is present, the air pressure in the hose will drop, indicating a failure. A third way detect a hose failure is the form of a disconnection is to sense a current through the connection to determine if it is on or off. All of these methods produce a signal that can be fed back to a monitor at the operator station and give the operator an alert if a hose failure occurs.

DESCRIPTION OF THE PREFERRED EMBODIMENT

Figure 1:
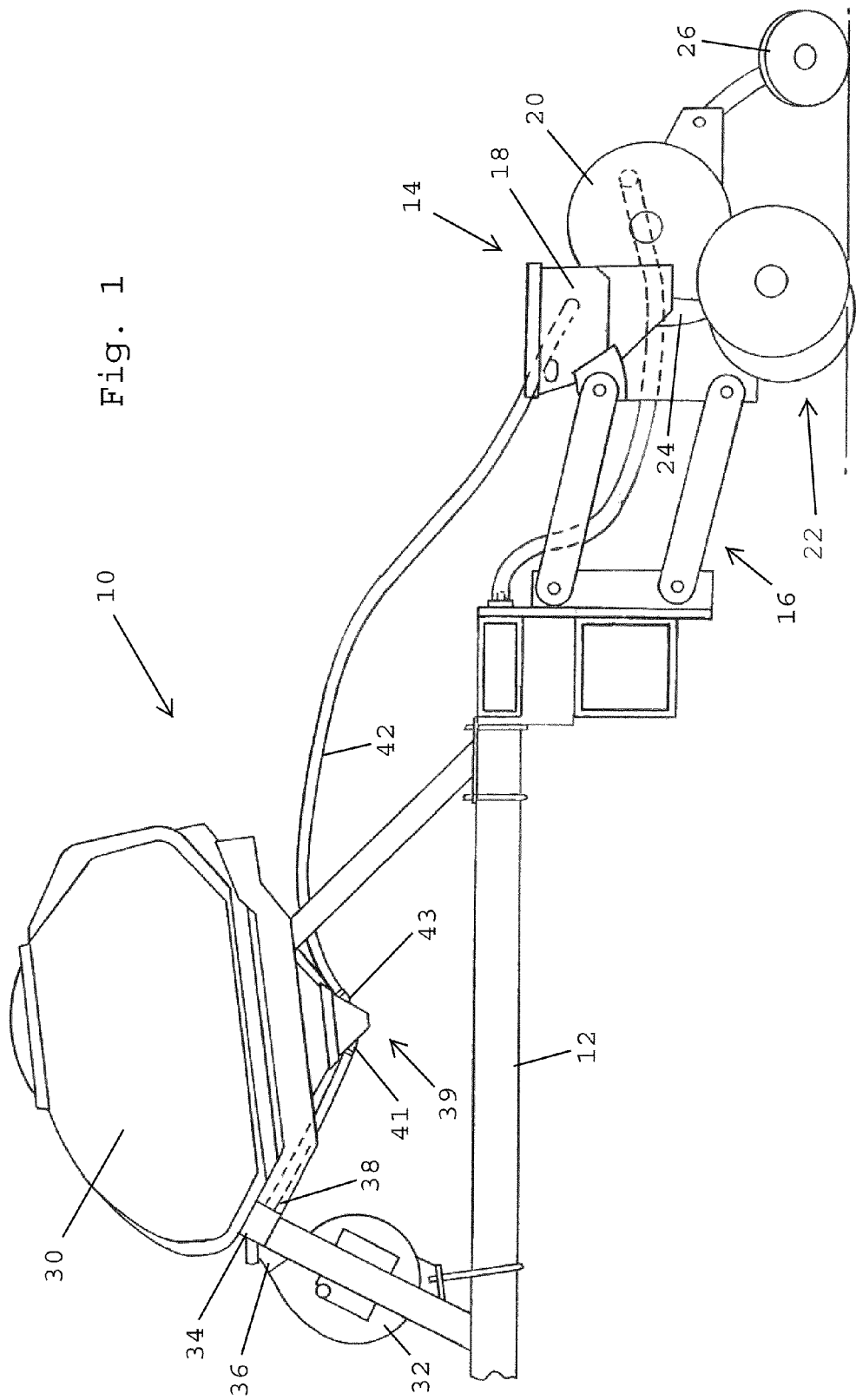
FIG. 1 is a side view of an agricultural planter using the pneumatic product-on-demand delivery system of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An agricultural seeding machine 10 comprises a frame 12 on which are mounted a plurality of individual planting units 14. The frame 12 includes a tongue (not shown) to connect the machine 10 to a tractor (not shown). The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the preferred embodiment the seed meter 20 is a vacuum seed meter, although other types of seed meters using mechanical assemblies or positive air pressure could also be used with the subject invention. It should be noted that the present invention could also be used to apply non-seed products to the field. For seed and non-seed products, the planting unit could be considered an application unit with an auxiliary hopper for holding product, a product meter for metering product received from the auxiliary hopper and an applicator for applying the metered product to a field. For example a dry chemical fertilizer or pesticide could be directed to the auxiliary hopper and metered by the product meter and applied to the field by the applicator.

The main frame 12 supports a main hopper 30 and an air pump 32. The air pump 32 is driven by a hydraulic motor; however other motor arrangements could be used, like electric motors for driving the air pump 32. The air pump 32 directs pressurized air to a manifold 34 through main air hose 36. The manifold 34 is formed from a hollow closed tubular support of the main frame 12. The manifold 34 is provided with a plurality of manifold outlets. Individual air supply lines 38 extend from the manifold outlets and direct pressurized air from the manifold 34 to the upstream side of the nozzle assembly 39. The nozzle assembly 39 is located at the bottom of the main hopper 30. Product located in the main hopper 30 flows by gravity to the nozzle assembly 39. The upstream side of the nozzle assembly 39 is provided with a number of air inlets 41 corresponding to the number of air supply hoses 38. The air inlets 41 are spaced transversely along the upstream side of the nozzle assembly 39. The downstream side of the nozzle assembly 39 is provided with a number of product outlets 43 corresponding to the number of air supply hoses 38. The product outlets 43 are also spaced transversely along the downstream side of the nozzle assembly 39. The product outlets 43 lie opposite from the air inlets 41. Each air inlet 41 is aligned with a respective product outlet 43. Product supply hoses 42 extend from the product outlets 43 to the individual auxiliary hoppers 18 for directing product entrained in the air stream to the auxiliary hoppers 18.

Figure 2:
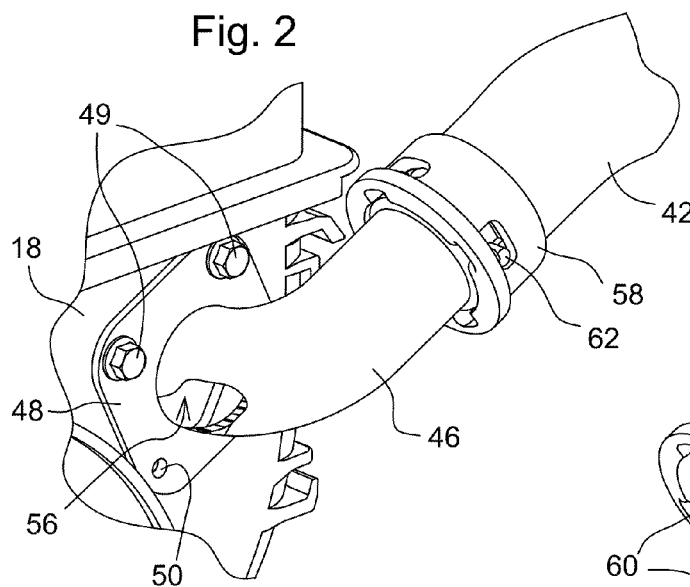
FIG. 2 is a perspective view of the product hose coupling to the auxiliary hopper on the row unit.
Figure 3:
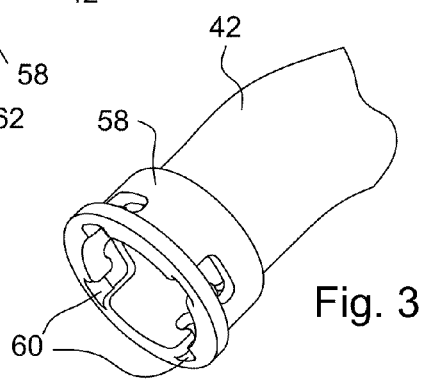
FIG. 3 is a perspective view of the hose coupling.
Figure 6:
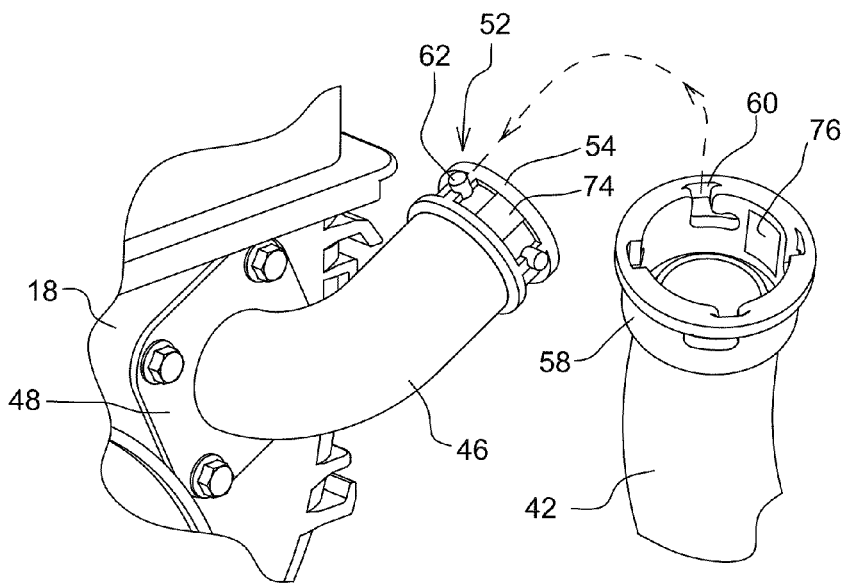
FIG. 6 is a perspective view of the hose coupling and the quick connect coupling on the hopper fitting having electrical contacts to detect a disconnection.

The auxiliary hopper 18 is connected to the product hose 42 through a fitting 46 shown in FIG. 2. Fitting 46 is coupled to the hopper 18 by use of a flange 48 and four fasteners 49, only two of which are shown inserted through openings 50 arranged in a rectangular pattern. The fitting 46 has an inlet 52 (FIG. 6) connected to the hose 42 by a quick connect coupling 54 (FIG. 6). The fitting further has an outlet 56 shown through the broken away portion of the fitting 46. The quick connect coupling 54 is engaged by a hose coupling 58 at the end of the hose 42. The hose coupling 58 has a plurality of L-shaped slots 60 that receive the posts 62 of the quick connect coupling 54. During use, it is often necessary for the operator to remove the hose 42 from the fitting 46, thus the connection between the quick connect coupling 54 and the hose coupling 58 must be easily disconnected. But by being easily disconnected, it is possible that due to vibrations during operation, the coupling can inadvertently become disconnected. If this occurs, seed or other product, will be dumped on the ground and wasted. The system of the present invention monitors the coupling and provides an alert to the operator of a disconnection.

Figure 4:
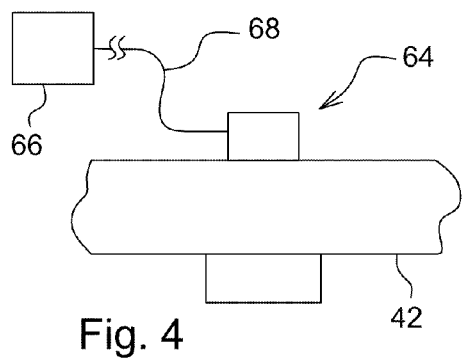
FIG. 4 is a side view of the product hose of one embodiment of the invention having a seed sensor on the product hose.

Various sensors can be used to determine if there is a disconnection or other hose failure. One sensor is shown in FIG. 4. A seed sensor 64 is provided in the hose 42 to sense the passage of seed there through. The seed-on-demand distribution system operates to fill the auxiliary hopper to a predetermined level. Once that level is reached, the air exit is block, causing air to stop flowing through the tube 42 and thus seed flow through the tube 42 will also stop. Seed sensor 64 can be any of a variety of common seed sensors. One such sensor is shown in U.S. Pat. No. 4,166,948 which comprises a LED optically exposed to the path of travel of seeds with photosensitive element detecting changes in light level. In normal operation, the flow of seeds in the tube 42 will periodically cease when the auxiliary hopper is filled, until the level of seed drops, allowing air to flow once again. If the sensor detects a continuous flow of seed over a predetermined period time without any cessation in the seed flow, that indicates the hose 42 is disconnected or that a hole has developed in the hose resulting in seed being dumped on the ground instead of filling the auxiliary hopper. The sensor 64 is connected to a monitor 66 by a wire 68, or wirelessly, to communicate a signal to the monitor. The monitor is located at the operator station of the tractor or other towing vehicle pulling the machine 10. An alert is provided by the monitor to the operator when a disconnection is detected.

Figure 5:
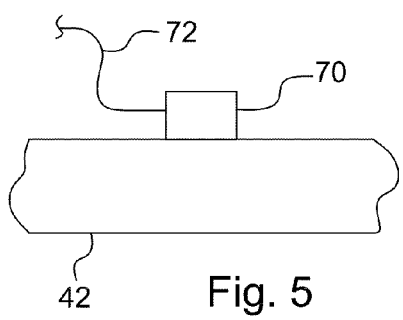
FIG. 5, is a side view of the product hose of another embodiment of the invention having a pressure sensor on the product hose.

FIG. 5 illustrates another sensor to detect a hose disconnection. Here, a pressure sensor 70 is provided on the hose 42 to measure the air pressure within the hose. During normal operation, an air pressure elevated above the ambient pressure will be present in the hose 42. However, if the hose becomes disconnected or if a leak develops in the hose, the pressure will drop to, or close to, ambient. The pressure sensor 70 communicates with the monitor via the wire 72 concerning the pressure in the hose. If the pressure falls below a predetermined value, an alert of a disconnection is provide by the monitor.

A further embodiment is shown in FIG. 6. There, electrical contact 74 is provided in the quick connect coupling 54 that mates with electrical contact 76 in the hose coupling 58. The slots 60 and posts 62 are arranged such that when the hose 42 is connected, the contacts 74 and 76 engage one another to complete an electrical circuit. Contacts 74 and 76 are connected by wires (not shown) to the monitor 66. If the circuit is opened, a disconnection has occurred and an alert is provided to the operator.

By monitoring and detecting a disconnection of the hose or other hose failure, lose of seed or other product can be minimized, resulting in a savings to the operator. While the invention has been shown in the context of a seeding machine, the invention can be used in other machines with other products that are conveyed by a pneumatic delivery system.

Having described the preferred embodiment, it will become apparent that various modifications can be made without departing from the scope of the invention as defined in the accompanying claims.

The invention claimed is:

1. A product-on-demand delivery system for an agricultural machine, the system comprising;
    a frame;
    a main hopper mounted on the frame, said main hopper having a nozzle assembly into which product in said main hopper is directed, the nozzle assembly comprising an air inlet and a product outlet;
    an application unit mounted to the frame, the application unit provided with an auxiliary hopper and a product meter for dispensing the product to a field, the product meter in communication with the auxiliary hopper to receive product therefrom, the auxiliary hopper having a product inlet;
    a product hose flow-coupled to said product outlet and to said auxiliary hopper inlet;
    an air source to deliver an air stream to the air inlet, through the nozzle to entrain product in the air stream and move the product through the product hose to the associated auxiliary hopper until the auxiliary hopper is filled after which the delivery of product ceases until the level of product in the auxiliary hopper is decreased;
    a sensor to detect disconnection of the product hose; and
    a monitor coupled to the sensor to provide an alert to an operator in the event the product hose is disconnected.

2. The product-on-demand delivery system of claim 1 wherein the sensor is a seed sensor mounted in the product hose to detect the passage of seed there through.

3. The product-on-demand deliver system of claim 2 wherein the monitor provides an alert when seed is continuously flowing over a predetermined period of time.

4. A product-on-demand delivery system for an agricultural machine, the system comprising:
    a frame;
    a main hopper mounted on the frame, said main hopper having a nozzle assembly into which product in said main hopper is directed, the nozzle assembly comprising an air inlet and a product outlet;
    an vacation unit mounted to the frame, the application unit provided with an auxiliary hopper and a product meter for dispensing the product to a field, the product meter in communication with the auxillary hopper to receive product therefrom, the auxiliary hopper haying a product inlet;
    a product hose flow-coupled to said product outlet and to said auxiliary hopper inlet;
    sensor to detect failure of the product hose wherein the sensor is a pressure sensor adapted to measure the pressure in the product hose; and
    a monitor coupled to the sensor to provide an alert to an operator in the event the product hose is disconnected wherein the monitor provides an alert when the sensed pressure drops below a predetermined value.

5. A product-on-demand delivery system for an agricultural machine, the system comprising:
a frame;
a main hopper mounted on the frame, said main hopper having a nozzle assembly into which product in said main hopper is directed, the nozzle assembly comprising an air inlet and a product outlet;
an application unit mounted to the frame, the application unit provided with an auxiliary hopper and a product meter for dispensing the product to a field, the product meter in communication with the auxiliary hopper to receive product therefrom, the auxiliary hopper having a product inlet;
a product hose flow-coupled to said product outlet and to said auxiliary hopper inlet;
a sensor to detect disconnection of the product hose from one of the product outlet and the auxiliary hopper inlet, the sensor including electrical contacts on the produce hose and one of the product outlet and the auxiliary hopper inlet and an electrical circuit completed when the product hose is coupled to the one of the product outlet and the auxiliary hopper inlet; and
a monitor coupled to the sensor to provide an alert to an operator in the event the electrical circuit is opened by the product hose becoming disconnected from the one of the product outlet and the auxiliary hopper inlet.

6. The product-on-demand delivery system of claim 5 wherein the monitor provides an alert when the electrical in open.

* * * * *